US009540134B2

(12) United States Patent
Melmon et al.

(10) Patent No.: US 9,540,134 B2
(45) Date of Patent: Jan. 10, 2017

(54) PROTECTIVE CASE INCLUDING COVER DEPLOYABLE AS AN ADJUSTABLE SUPPORT STRUCTURE AND RELATED DEVICES, SYSTEMS AND METHODS

(71) Applicant: Touchfire, Inc., Seattle, WA (US)

(72) Inventors: Bradley S. Melmon, Seattle, WA (US); Steven A. Isaac, Seattle, WA (US)

(73) Assignee: Touchfire, Inc., Seattle, WA (US)

( * ) Notice: Subject to any disclaimer, the term of this patent is extended or adjusted under 35 U.S.C. 154(b) by 433 days.

(21) Appl. No.: 14/149,799

(22) Filed: Jan. 7, 2014

(65) Prior Publication Data

US 2015/0191273 A1    Jul. 9, 2015

(51) Int. Cl.
*B65D 5/52*    (2006.01)
*G06F 1/16*    (2006.01)

(52) U.S. Cl.
CPC ............ *B65D 5/5206* (2013.01); *G06F 1/16* (2013.01)

(58) Field of Classification Search
CPC ... B65D 5/5206; B65D 5/52; A45C 2011/001; A45C 2011/002; A45C 2011/003; G06F 1/1628
USPC ................. 206/320, 45.23, 45.2, 45.24, 818
See application file for complete search history.

(56) References Cited

U.S. PATENT DOCUMENTS

| 8,807,333 | B1 * | 8/2014 | Cooper | A45C 11/00 206/320 |
| 8,960,421 | B1 * | 2/2015 | Diebel | G06F 1/1679 206/320 |
| 9,266,641 | B2 * | 2/2016 | Quehl | A45C 11/00 |
| 2012/0088557 | A1 * | 4/2012 | Liang | G06F 1/1628 455/575.1 |
| 2013/0242490 | A1 * | 9/2013 | Ku | G06F 1/1628 361/679.3 |
| 2014/0291177 | A1 * | 10/2014 | Ko | G06F 1/1626 206/45.23 |
| 2014/0311927 | A1 * | 10/2014 | Kang | B65D 5/5206 206/45.28 |
| 2015/0001105 | A1 * | 1/2015 | Nyholm | A45C 11/00 206/45.2 |
| 2015/0041341 | A1 * | 2/2015 | Marshall | A45C 11/00 206/45.2 |
| 2015/0335115 | A1 * | 11/2015 | Kim | A45C 11/00 224/191 |

* cited by examiner

*Primary Examiner* — Steven A Reynolds
(74) *Attorney, Agent, or Firm* — Perkins Coie LLP

(57) ABSTRACT

A protective case for use with a personal electronic device includes a backing shaped to securely attach to a back side of the device and an articulated cover configured to extend over a front side of the device. The backing includes end portions configured to secure opposite edges of the device, and a first coupling component spaced apart from the end portions of the backing. The cover includes a plurality of panels and a second coupling component releasably securable to the first coupling component. The cover is movable into a configuration in which the first and second coupling components are attached to one another and the plurality of panels form a support structure that supports the device at an angle relative to a horizontal support surface. The support structure is adjustable to change the angle without detaching the first and second coupling components from one another.

21 Claims, 19 Drawing Sheets

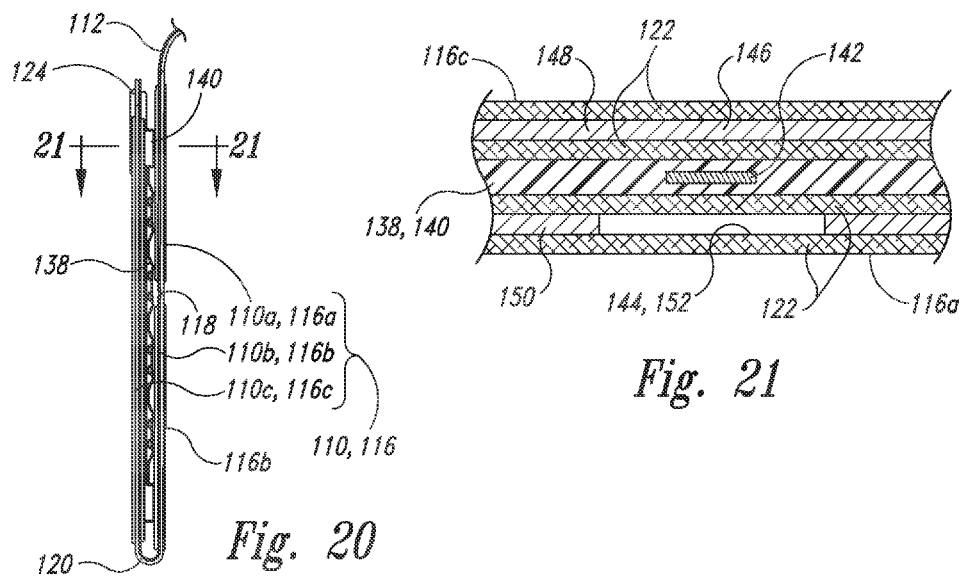
Fig. 20
Fig. 21
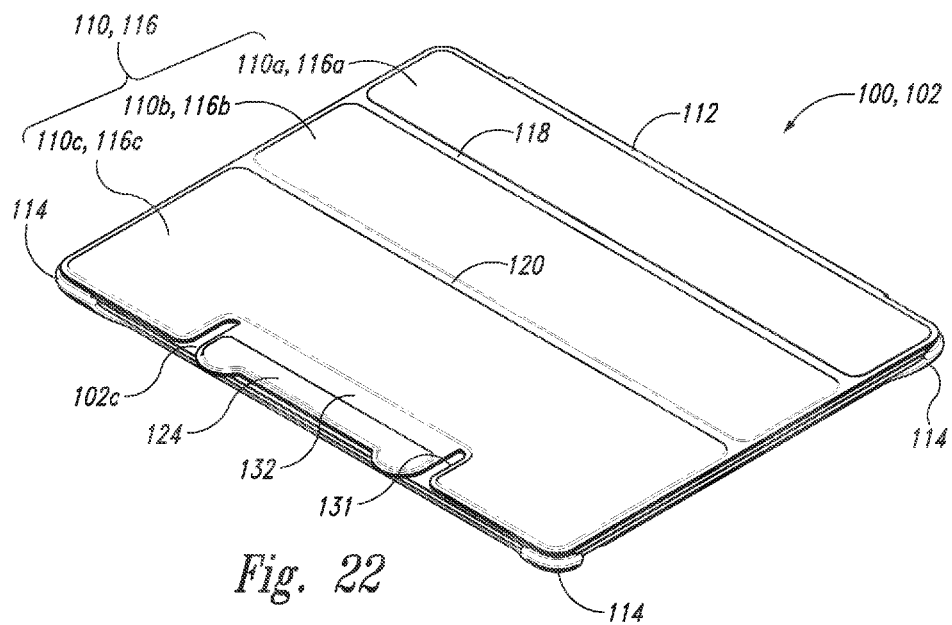
Fig. 22

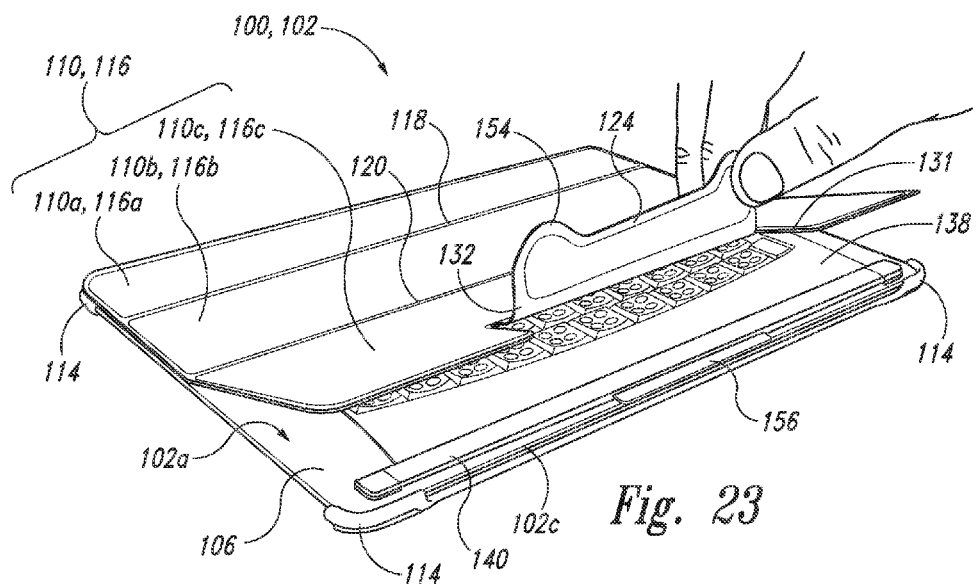
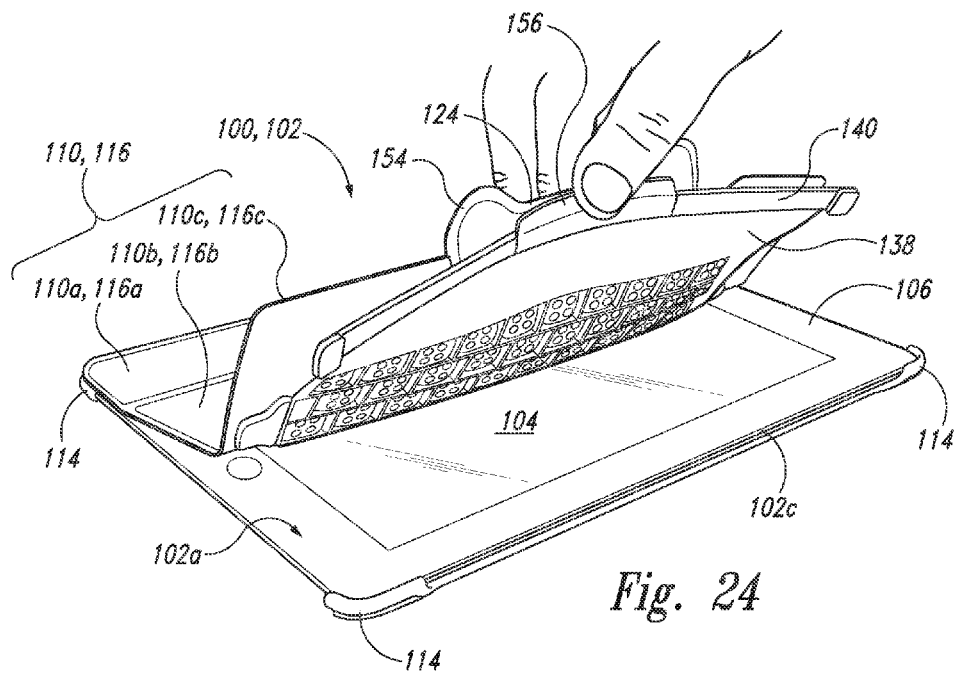

PROTECTIVE CASE INCLUDING COVER DEPLOYABLE AS AN ADJUSTABLE SUPPORT STRUCTURE AND RELATED DEVICES, SYSTEMS AND METHODS

TECHNICAL FIELD

The present technology is related to protective cases and other accessories useable with personal electronic devices. In particular, at least some embodiments are related to protective cases respectively including covers deployable as adjustable support structures.

BACKGROUND

Many personal electronic devices (e.g., tablet computers, laptop computers, and mobile telephones) are relatively compact and streamlined in form. A typical example of such devices is slab-shaped with expansive front and back surfaces and a relatively narrow edge extending between respective perimeters of the front and back surfaces. A touchscreen may occupy nearly all of the front surface. Although devices of this form are often rectangular and flat with rounded or non-rounded corners, other shapes are also possible. In general, the form of these devices may facilitate mobility, such as by allowing the devices to be conveniently stowed in briefcases, purses, pockets, and other locations closely associated with a user. The same form, however, may also tend to exclude certain features that occupy space, such as features that serve protective and ergonomic functions. For example, many slab-shaped personal electronic devices lack even rudimentary features to protect the devices from impact damage. As another example, these and other devices may be designed to be used in different positions respectively corresponding to different viewing angles, but the devices may include few, if any, features that allow the devices to be self-supporting in these positions. Accessories, such as retrofitted after-market accessories, may be used to compensate for these and other deficiencies.

BRIEF DESCRIPTION OF THE DRAWINGS

Many aspects of the present technology can be better understood with reference to the following drawings. The components in the drawings are not necessarily to scale. Instead, emphasis is placed on illustrating clearly the principles of the present technology. For ease of reference, throughout this disclosure identical reference numbers may be used to identify identical or at least generally similar or analogous components or features.

FIG. 20 is a side profile view of a portion of the case shown in FIGS. 1 and 2 with the cover in the open configuration, the first and second coupling components detached from one another, the support structure in the subconfiguration shown in FIG. 17, and a keyboard overlay stowed within the support structure.

FIG. 21 is an enlarged cross-sectional view taken along the line 21-21 in FIG. 20.

FIG. 22 is a profile view of the case and the device shown in FIGS. 1 and 2 with the cover in the closed configuration shown in FIG. 9.

FIG. 23 is a perspective view of the case and the device shown in FIGS. 1 and 2 with the cover in the process of being opened using a first gripping element of the cover so as to break a magnetic connection between the keyboard overlay shown in FIG. 20 and the cover.

FIG. 24 is a perspective view of the case and the device shown in FIGS. 1 and 2 with the cover in the process of being opened using a second gripping element of the keyboard overlay so as to break a magnetic connection between the keyboard overlay shown in FIG. 20 and the device.

DETAILED DESCRIPTION

The present technology is related to protective cases and other accessories useable with personal electronic devices, such as slab-shaped (e.g., tablet shaped) personal electronic devices. Examples of compatible devices include tablet computers, e-book readers, laptop computers, and smartphones, among others. Protective cases configured in accordance with at least some embodiments of the present technology allow an encased device to be conveniently positioned and repositioned in one of several self-supporting tilted positions well suited for viewing and operating the device. In these and other embodiments, the cases may also protect an encased device from impact damage. For example, a protective case configured in accordance with a particular embodiment includes a cover that, in a closed configuration, overlays a screen of an encased electronic device and, in an open configuration, forms a support structure capable of supporting the encased device at two or more different titled positions. Furthermore, these and other protective and ergonomic enhancements may be provided without unduly increasing the bulk of an encased device or otherwise compromising a streamlined form of the device.

In contrast to conventional protective cases, protective cases configured in accordance with embodiments of the present technology can be more convenient, more versatile, more compact, and/or have other advantages.

Specific details of protective cases and related devices, systems, and methods in accordance with several embodiments of the present technology are described herein with reference to FIGS. 1-32. A person of ordinary skill in the art will understand that protective cases and related devices, systems, and methods configured in accordance with other embodiments of the present technology can have other configurations, components, and/or procedures in addition to or instead of those disclosed herein and that the described protective cases and related devices, systems, and methods can be without several of the configurations, components, and/or procedures disclosed herein without deviating from the present technology. As used herein, the terms "distal" and "proximal" define a position or direction with respect to a reference position. The terms, "distal" and "distally" refer to a position distant from or in a direction away from a reference position. The terms "proximal" and "proximally" refer to a position near or in a direction toward a reference position. Unless the context clearly indicates otherwise, the reference position is a position of a hinge between a backing and a cover of a protective case.

Figure 1:
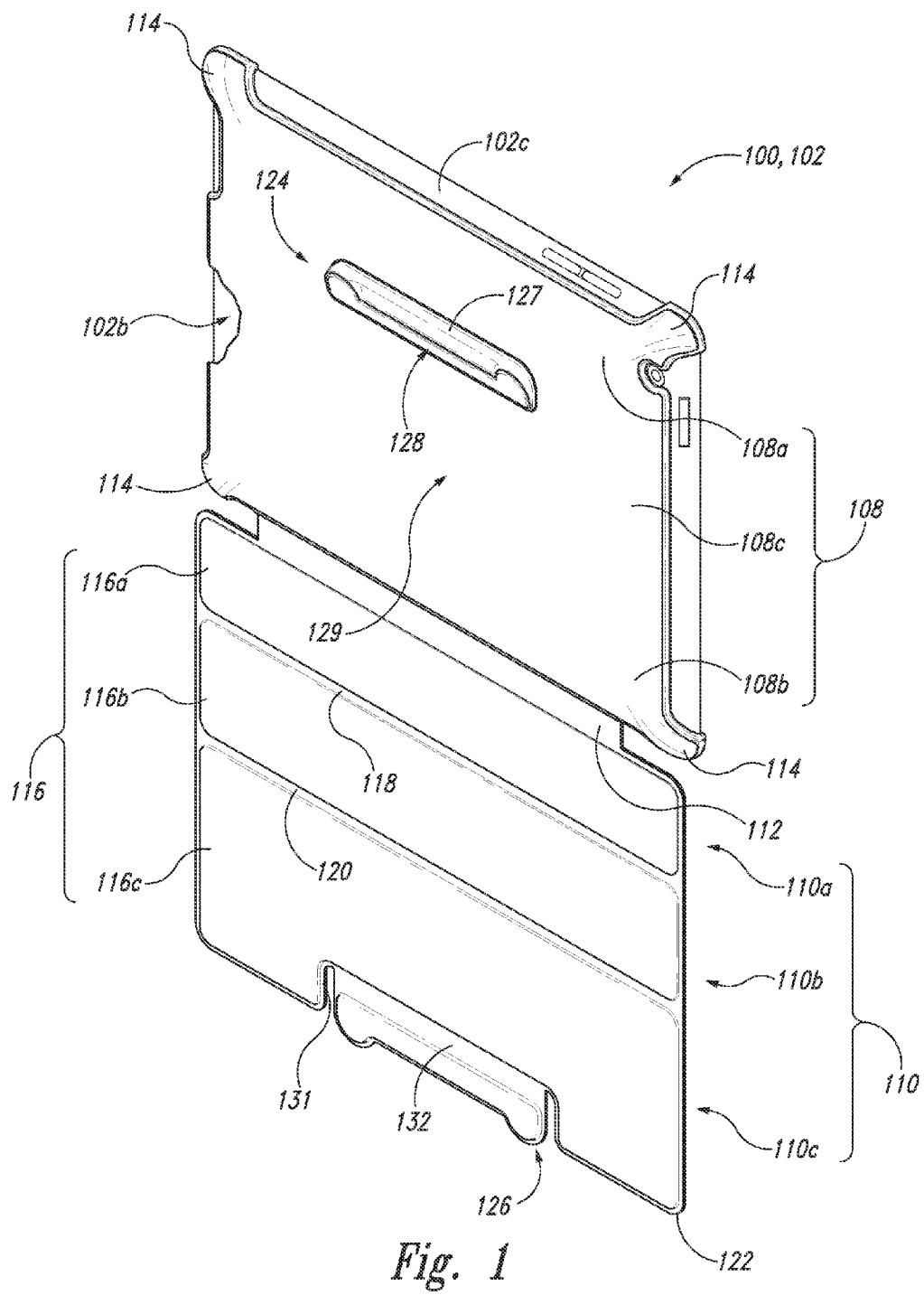
FIGS. 1 and 2 are, respectively, different perspective views of a protective case configured in accordance with an embodiment of the present technology and an associated electronic device. The case can include a backing, a cover, and a hinge therebetween. The backing and the cover can include, respectively, a first coupling component and a second coupling component.
Figure 2:
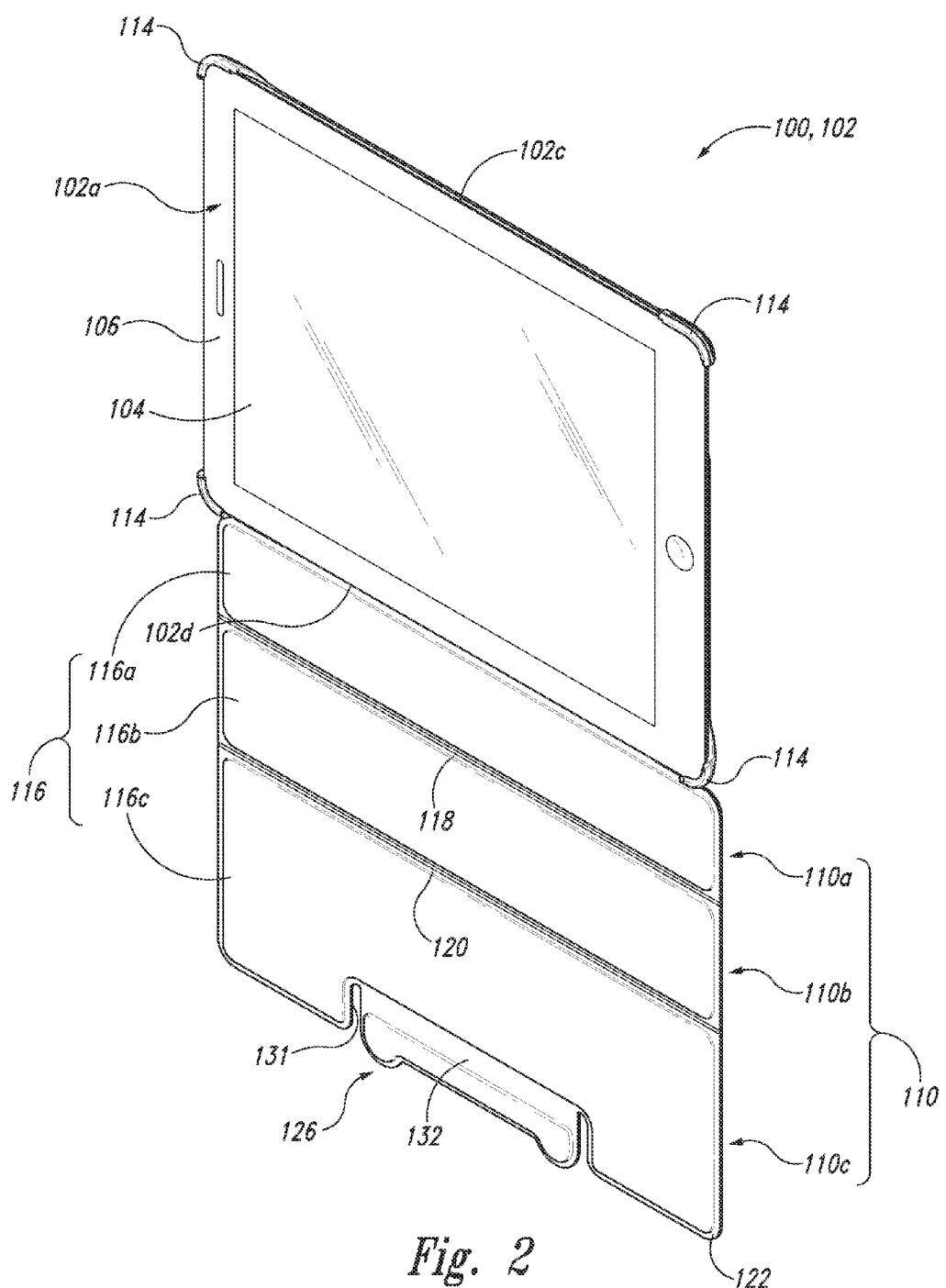
Figure 3:
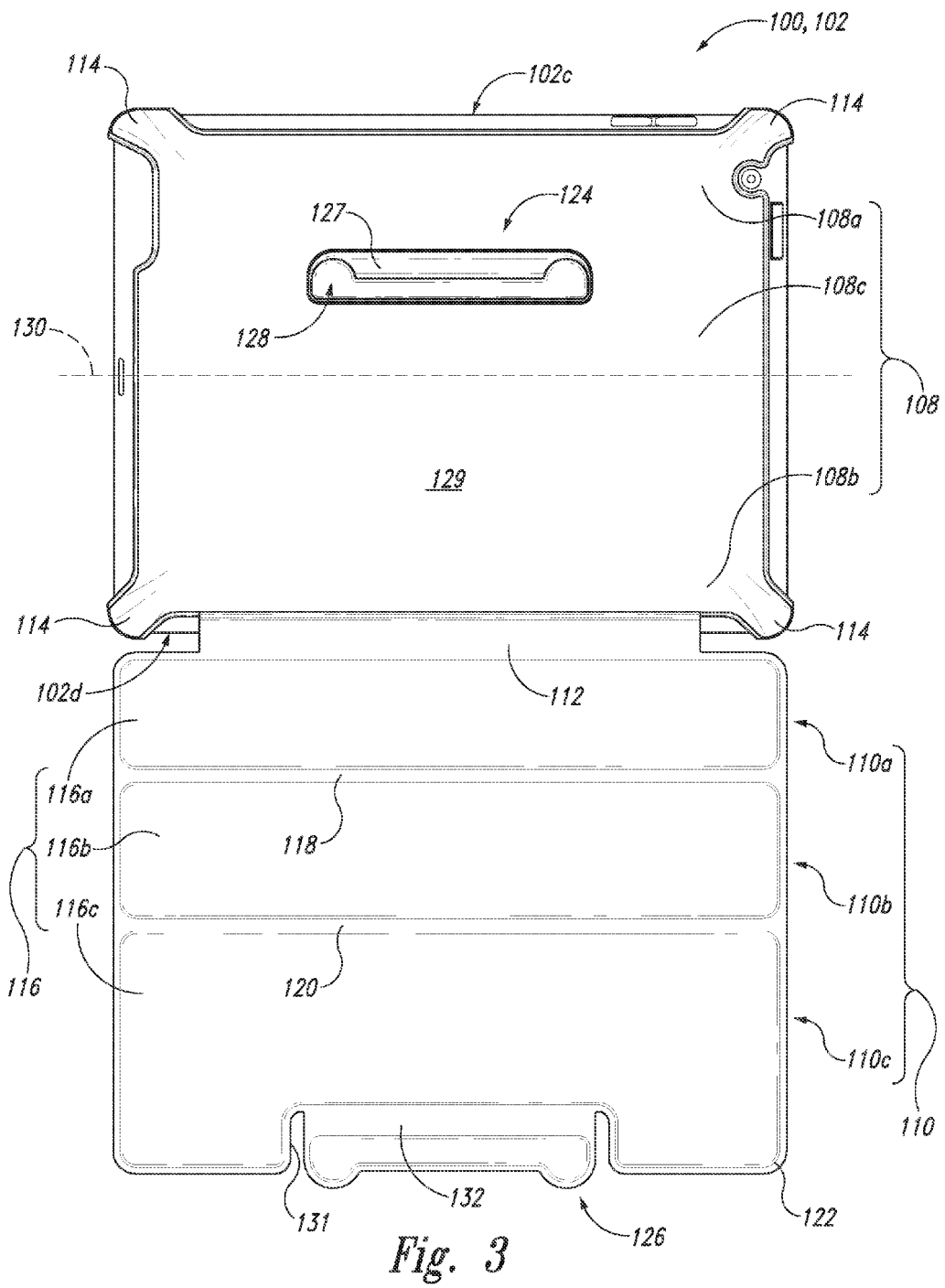
FIGS. 3, 4, 5, 6, 7 and 8 are, respectively, an inverse plan view, a plan view, a first side profile view, a second side profile view, a first end profile view, and a second end profile view of the case and the device shown in FIGS. 1 and 2.
Figure 4:
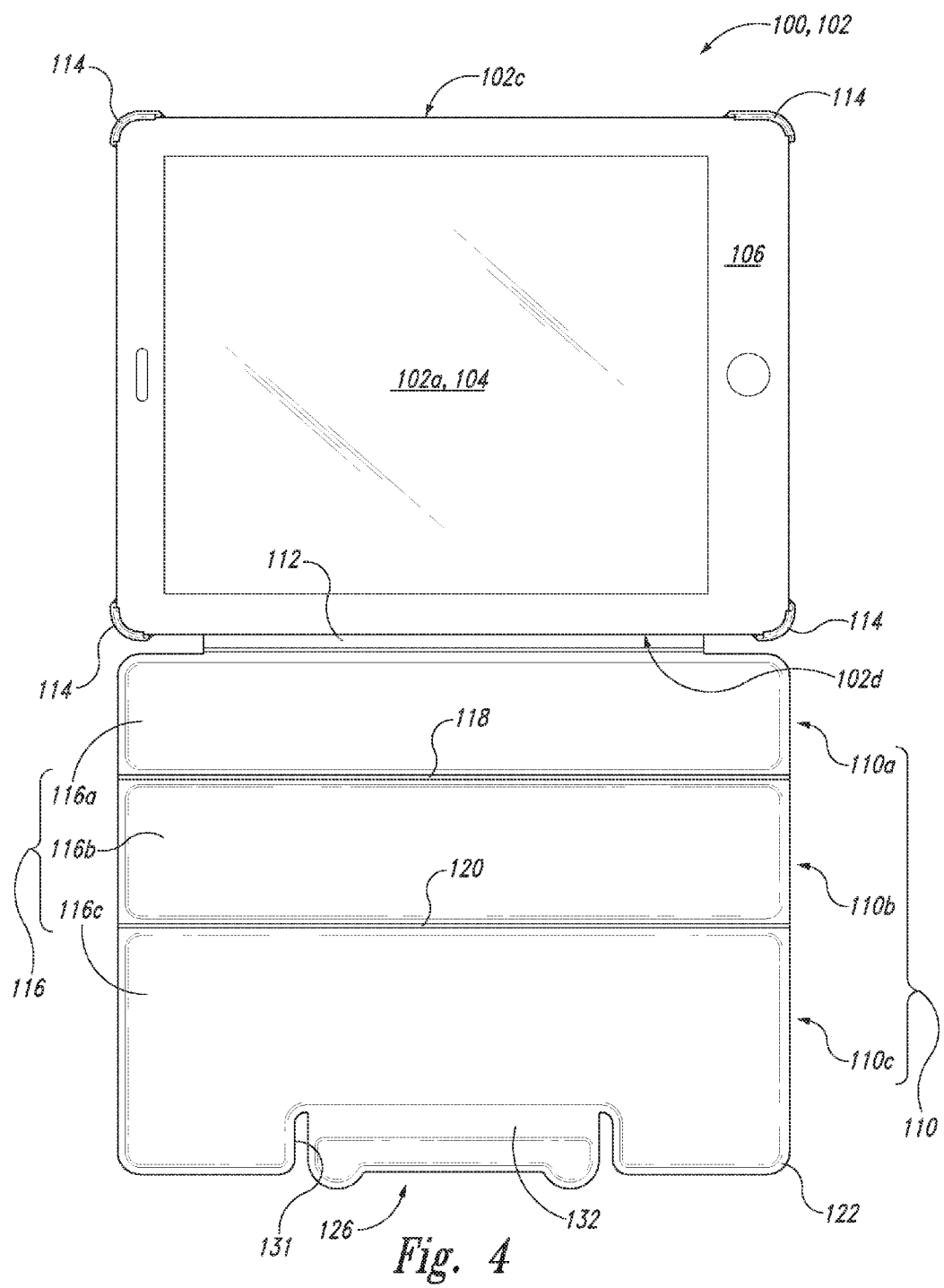
Figure 5:
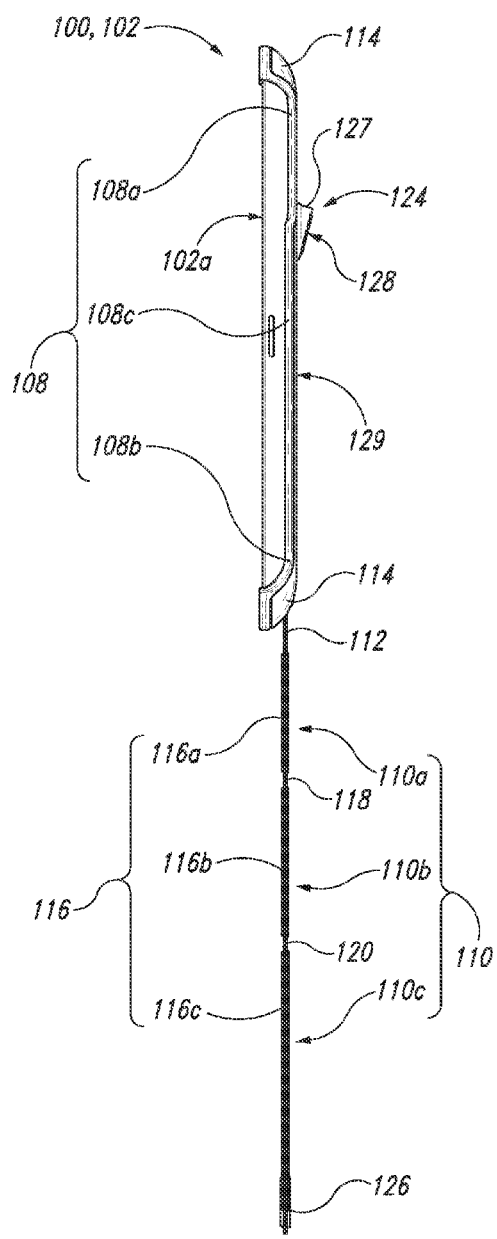
Figure 6:
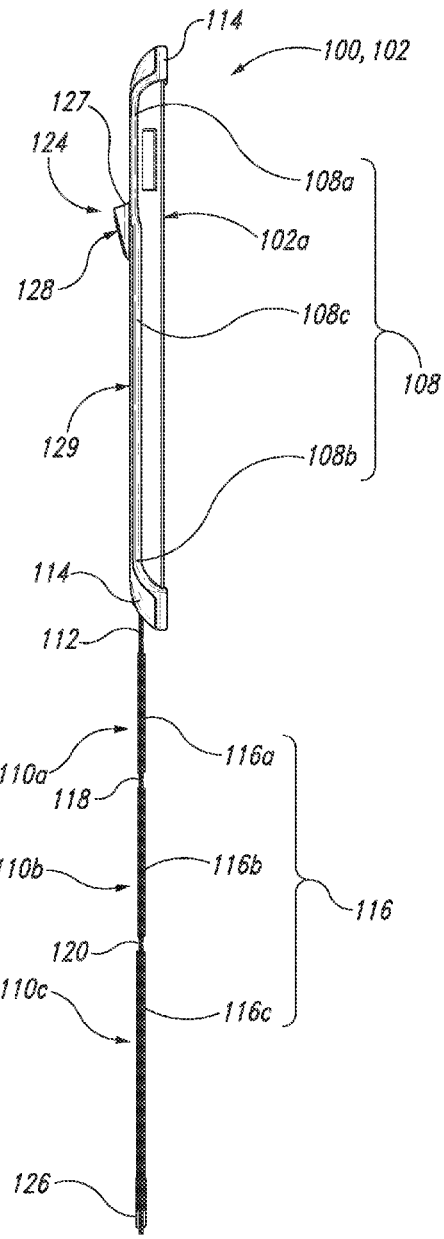
Figure 7:
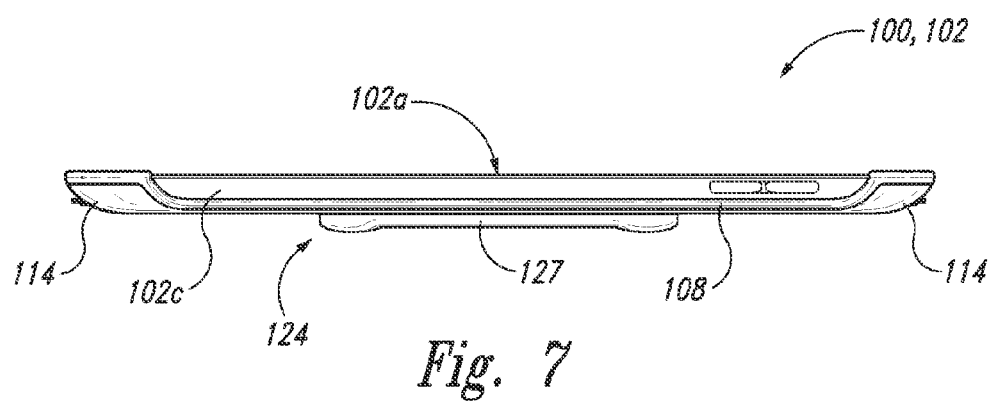
Figure 8:
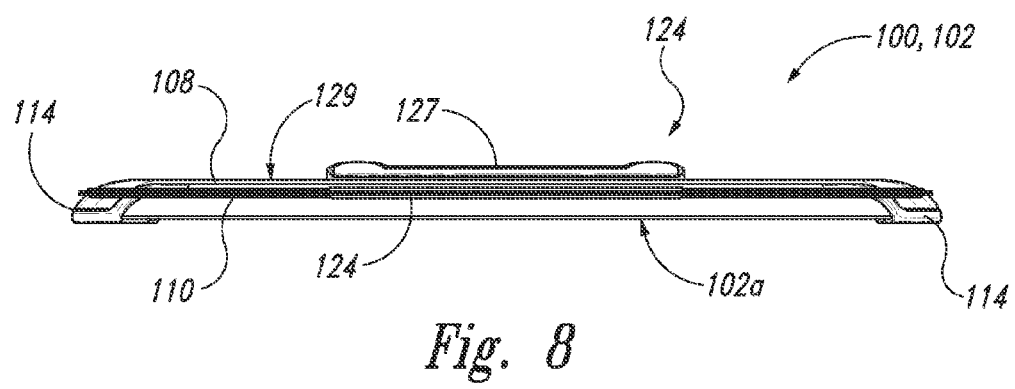

FIGS. 1 and 2 are, respectively, different perspective views of a protective case 100 configured in accordance with an embodiment of the present technology and an associated electronic device 102. FIGS. 3, 4, 5, 6, 7 and 8 are, respectively, an inverse plan view, a plan view, a first side profile view, a second side profile view, a first end profile view, and a second end profile view of the case 100 and the device 102. With reference to FIGS. 1-8 together, the case 100 can include a backing 108, a cover 110, and a first hinge 112 extending therebetween. The device 102 can be slab-shaped with a front side 102a (FIG. 2), a back side 102b (FIG. 1) opposite to the front side 102a, a first edge 102c (FIG. 1), and a second edge 102d (FIG. 2) opposite to the first edge 102c. At its front side 102a, the device 102 can include a screen 104 (FIG. 2) and a peripheral region 106 (FIG. 2) around a perimeter of the screen 104. The backing 108 can be shaped to securely attach to the back side 102b of the device 102. Suitable materials for the backing 108 include plastics (e.g., injection-molded plastics), elastomers (e.g., low-, medium-, and high-durometer elastomers), sprung metal, cloth, elastomeric cloth, and combinations thereof.

The cover 110 can be configured to be moved into and out of a closed configuration in which the cover 110 is flush with or otherwise overlays the front side 102a of the device 102. The first hinge 112 can be configured to wrap around the second edge 102d of the device 102. For example, the first hinge 112 can be a floating hinge or another suitable type of hinge capable of bending at two or more axes. In the illustrated embodiment, the first hinge 112 is an elongate flexure bearing with sufficient width to extend over the second edge 102d of the device 102 from a perimeter of the front side 102a of the device 102 to a perimeter of the back side 102b of the device 102. In other embodiments, the first hinge 112 can have another suitable form. For example, the first hinge 112 can include two or more barrel hinge elements (not shown), such as one barrel hinge element positioned to be proximate to the perimeter of the front side 102a of the device 102 and a second barrel hinge element positioned to be proximate to the perimeter of the back side 102b of the device 102.

With reference again to FIGS. 1-8, the backing 108 can include an elongate first end portion 108a, an elongate second end portion 108b parallel to the first end portion 108a, and a planar central portion 108c extending therebetween. The first end portion 108a of the backing 108 can be configured to secure at least a portion of the first edge 102c of the device 102. Similarly, the second end portion 108b of the backing 108 can be configured to secure at least a portion of an opposite second edge 102d of the device 102. In the illustrated embodiment, the backing 108 includes four corner crooks 114 respectively positioned to engage (e.g., to cradle or otherwise conformationally constrain) four corners of the device 102. The first hinge 112 can be coupled to the second end portion 102b of the backing 108 between two of the corner crooks 114. Alternatively or in addition, the case 100 can include other structures to prevent the device 102 from sliding out of the backing 108. For example, resilient clips (not shown) or continuous grooves (also not shown) can be used in addition to or instead of the corner crooks 114. As another example, the case 100 can include a hook-and-loop fastener (not shown) or another suitable fastener positioned between an inwardly facing surface of the backing 108 and the back side 102b of the device 102.

The cover 110 can be articulated to allow the cover 110 to be deployed as a support structure (e.g., a three-dimensional support structure) when not being used to protect the front side 102a of the device 102. For example, the cover 110 can include a proximal panel 116a, an intermediate panel 116b, and a distal panel 116c (referenced collectively as "panels 116" or individually as "individual panels 116") respectively disposed at a proximal portion 110a, an intermediate portion 110b, and a distal portion 110c of the cover 110. The individual panels 116 can be elongate and parallel to one another. Suitable materials for the panels 116 includes rigid and semi-rigid materials, such as structural metals, plastics, and composites. Operably positioned between the proximal and intermediate panels 116a, 116b, the cover 110 can include a second hinge 118. Similarly, operably positioned between the intermediate and distal panels 116b, 116c, the cover 110 can include a third hinge 120. As with the first hinge 112, the second hinge 118, the third hinge 120, or both can be flexure bearings, include barrel hinge elements, or have other suitable forms. For example, the cover 110 can include a flexible webbing 122, the panels 116 can include respective plates (not shown) sandwiched between layers of the webbing 122, and the second and third hinges 118, 120, respectively, can be unsupported portions of the webbing 122 between the panels 116.

The backing 108 and the cover 110 can include, respectively, a first coupling component 124 and a second coupling component 126 releasably securable to one another. The first and second coupling components 124, 126 can be elongate and parallel to one another. The first coupling component 124 can include a wedge-shaped bearing 127 and a bearing surface 128 and can be disposed on an outwardly facing surface 129 of the central portion 108c of the backing 108. The bearing surface 128 can angle away from the surface 129 of the central portion 108c of the backing 108 such that a proximal end of the bearing surface 128 is closer to the surface 129 than is a distal end of the bearing surface 128. In at least some embodiments, the first coupling component 124 is spaced apart from the first and second end portions 108a, 108b of the backing 108. Furthermore, the first coupling component 124 can be positioned closer to the first end portion 108a of the backing 108 than to the second end portion 108b of the backing 108. For example, the first coupling component 124 can be centrally positioned between the first end portion 108a of the backing 108 and an axis 130 (FIG. 2) parallel to the first and second end portions 108a, 108b of the backing 108 that bisects the central portion 108c of the backing 108. The second coupling component 126 can extend distally from the distal panel 116c. For example, the distal panel 116c can include a distally oriented inset 131, and the second coupling component 126 can be a tab positioned at least partially within the inset 131. In some embodiments, the second coupling component 126 includes flaps (not shown) that restrict bending of the second coupling component 126 to one side of the cover 110, such as by overlapping the distal panel 116c at one or both sides of the inset 131. In other embodiments, the second coupling component 126 can be without such features.

The second coupling component 126 can be hingedly connected to the distal panel 116c. For example, the cover 110 can include a fourth hinge 132 operably positioned between the distal panel 116c and the second coupling component 126. In the illustrated embodiment, the first coupling component 124 is fixedly connected to the backing 108. In other embodiments, the first coupling component 124 can be hingedly connected to the backing 108 in addition to or instead of the second coupling component 126 being hingedly connected to the distal panel 116c. In still other embodiments, the first and second coupling components 124, 126 can be fixedly connected, respectively, to the backing 108 and to the distal panel 116c. When hingedly connected, respectively, to the backing 108 and to the distal panel 116c, the first and second coupling components 124, 126 can be configured to bend along one or more axes. For example, as with the cover 110, the first and second coupling components 124, 126 can be articulated.

With reference again to FIGS. 1-8, the first and second coupling components 124, 126 can be configured to be magnetically attached to one another. For example, the first and second coupling components 124, 126 can respectively include magnets (e.g., rare-earth magnets) that form a stable connection when the first and second coupling components 124, 126 are squarely attached to one another. This connection mechanism can facilitate blind coupling of the first and second coupling components 124, 126. For example, a user positioned at the front side 102a of the device 102 may be able to open the cover 110 and couple the first and second coupling components 124, 126 to one another by touch without having to view the back side 102b of the device 102. This operation can include sliding a distal edge of the distal panel 116c along the backing 108 from the first end portion 108a of the backing 108 toward the second end portion 108b of the backing 108. When the first and second coupling components 124, 126 move into close proximity, magnetic attraction can cause the first and second coupling components 124, 126 to squarely attach to one another.

The respective north-south orientations of magnets within the first and second coupling components 124, 126 can be selected to increase the degree to which a connection between the first and second coupling components 124, 126 resists separation. When the first and second coupling components 124, 126 are attached to one another, the second coupling component 126 can be in face-to-face contact with the bearing surface 128. The respective orientations of magnets within the first and second coupling components 124, 126 can be perpendicular to the bearing surface 128 and to a corresponding face of the second coupling component 126. This can be useful to increase the degree to which a connection between the first and second coupling components 124, 126 resists separation in response to uniaxial normal stress. In addition or alternatively, magnets within the first and second coupling components 124, 126 can have respective orientations at one or more angles less than 90 degrees relative to the bearing surface 128 and to the corresponding face of the second coupling component 126. This can be useful to increase the degree to which a connection between the first and second coupling components 124, 126 resists separation in response to shear stress. The angle of the bearing surface 128 can be selected to cause the a connection between the first and second coupling components 124, 126 to resist separation in response to force associated with using the device 102, such as downward force that results from keystrokes on the screen 104. In at least some embodiments, the bearing 127 causes the bearing surface 128 to be more perpendicular to the direction of this force than it would be if the bearing surface 128 were parallel to the surface 129 of the central portion 108c of the backing 108. In this way, the bearing 127 can increase the stability of a connection between the first and second coupling components 124, 126 when the cover 110 is in the open configuration.

Many alternatives to magnetic coupling of the first and second coupling components 124, 126 are possible. For example, the first and second coupling components 124, 126 can include respective halves of a releasable non-magnetic mechanical coupler (not shown). Examples of such couplers include snaps, hook-and-loop tape, and buckles (e.g., side-release buckles and cam-lock buckles), among others. Furthermore, the first and second coupling components 124, 126 can include respective halves of both magnetic and non-magnetic couplers, such as a magnetic coupler to facilitate blind alignment of the first and second coupling components 124, 126 and a non-magnetic coupler to facilitate releasable locking of the first and second coupling components 124, 126 to one another. When the first and second coupling components 124, 126 are magnetic and individually include multiple magnets, the magnets can be arranged with alternating polarities to further facilitate alignment of the first and second coupling components 124, 126. As another yet variation, one or both of the first and second coupling components 124, 126 can have an adjustable position. For example, the first coupling component 124 can be positioned on a retractable tongue (not shown) that can be adjusted and locked at different extensions to cause the first coupling component 124 to have different positions relative to the backing 108. Such a tongue can be locked, for example, between jaws of a clamping mechanism (not shown).

Figure 9:
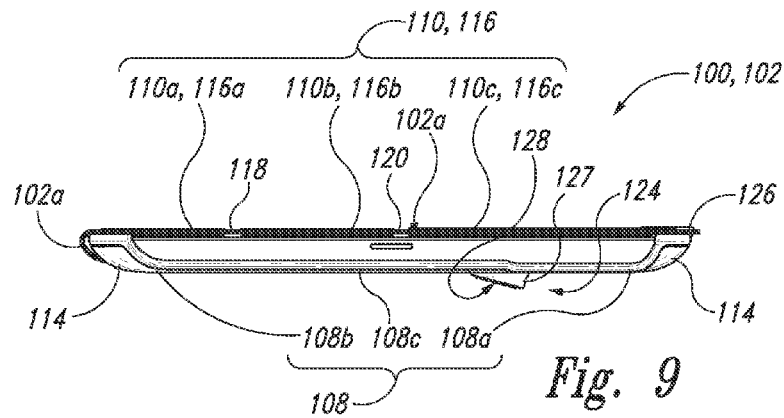
FIG. 9 is a side profile view of the case and the device shown in FIGS. 1 and 2 with the cover in a closed configuration in which panels of the cover overlay a front side of the device.

FIG. 9 is a side profile view of the case 100 and the device 102 with the cover 110 in a closed configuration in which the panels 116 are disposed in a coplanar arrangement overlaying the front side 102a of the device 102. In this configuration, the cover 110 can protect the screen 104 from damage. The cover 110 can be held in this position magnetically, mechanically, or in another suitable manner. In some embodiments, the device 102 includes a peripheral magnet (not shown) embedded within the peripheral region 106 and a portion of the cover 110 overlaying the peripheral magnet when the cover 110 is in the closed configuration is made of ferrous metal. For example, all or a portion of the distal panel 116c can be made of ferrous metal and the distal panel 116c can overlay the peripheral magnet when the cover 110 is in the closed configuration. In addition or alternatively, the distal panel 116c or another suitable portion of the cover 110 can include another magnet (not shown) that overlays the peripheral magnet when the cover 110 is in the closed configuration. The attraction between the magnet of the cover 110 and the peripheral magnet of the device 102 can help to align the cover 110 in a predetermined position when the cover 110 is in the closed configuration.

The cover 110 can be movable between the closed configuration and an open configuration by bending the first hinge 112. FIGS. 10-13 are side profile views of the case 100 and the device 102 with the cover 110 in the open configuration in which the panels 116 form a support structure 134 and the first and second coupling components 124, 126 are attached to one another. The support structure 134 can support the device 102 at an angle relative to a horizontal support surface 136. Furthermore, the support structure 134 can be adjustable to change the angle without detaching the first and second coupling components 124, 126 from one another. For example, the support structure 134 is shown in FIGS. 10-13 in four different respective subconfigurations to support the device 102 at four different respective angles relative to the support surface 136. When the cover 110 is in the open configuration, the panels 116 and the backing 108 can collectively form at least a portion of a perimeter of a closed loop.

Figure 10:
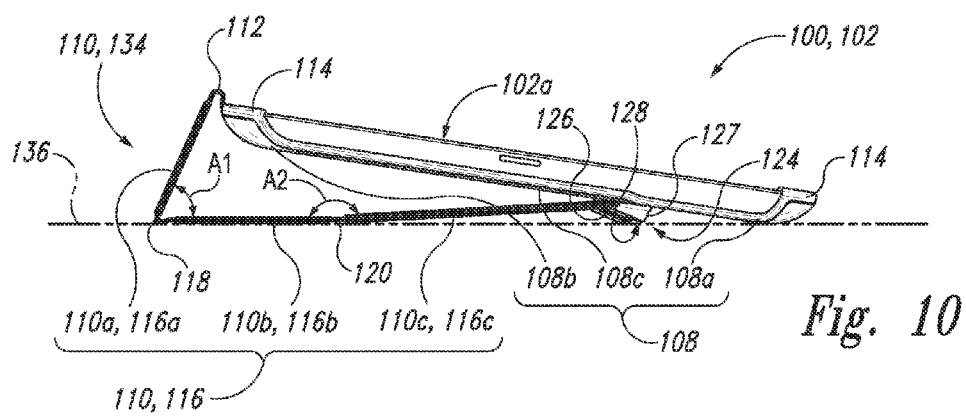
FIGS. 10-13 are side profile views of the case and the device shown in FIGS. 1 and 2 with the cover in an open configuration in which the panels form a support structure and the first and second coupling components are attached to one another. The support structure is shown in FIGS. 10-13 in four different respective subconfigurations to support the device at four different respective angles relative to a horizontal support surface.
Figure 11:
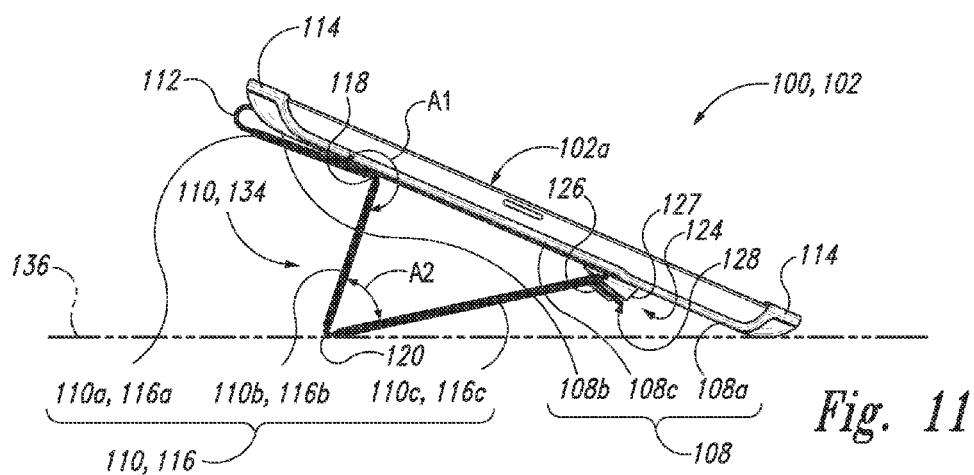
Figure 12:
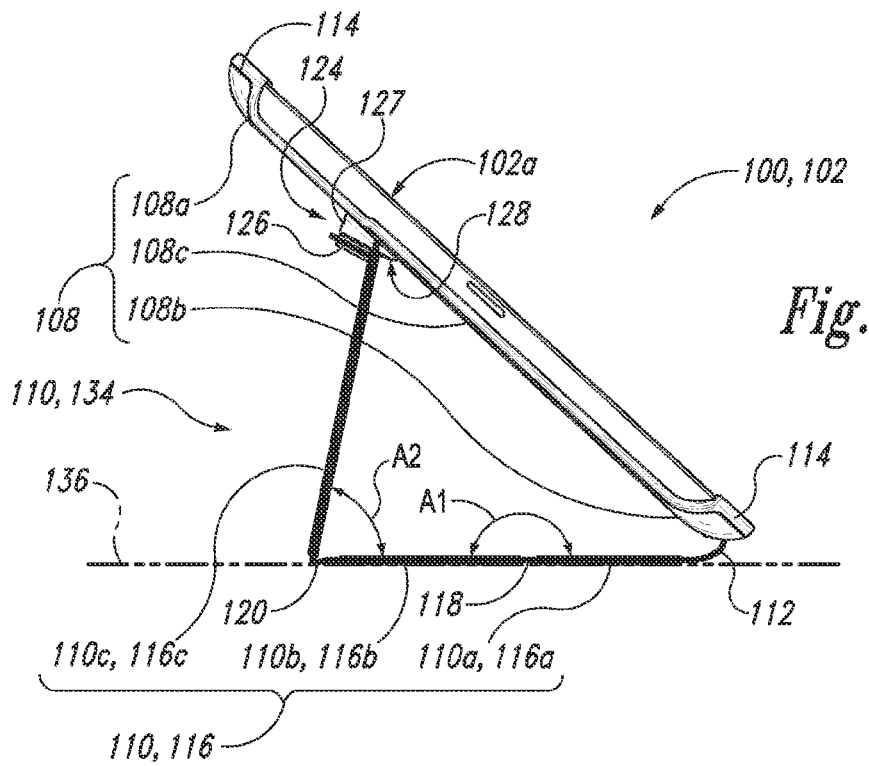

As shown in FIGS. 10-13, the closed loop can include a first interior angle A1 between the proximal and intermediate panels 116a, 116b and a second interior angle A2 between the intermediate and distal panels 116b, 116c. The support structure 134 can be adjustable to change the angle of the device 102 by either adjusting the second hinge 118 to increase the first interior angle A1 and adjusting the third hinge 120 to decrease the second interior angle A2 or by adjusting the second hinge 118 to decrease the first interior angle A1 and adjusting the third hinge 120 to increase the second interior angle A2. Adjusting the support structure 134 from the subconfiguration shown in FIG. 10 to the subconfiguration shown in FIG. 11 and adjusting the support structure 134 from the subconfiguration shown in FIG. 13 to the subconfiguration shown in FIG. 12 are examples of the former. The opposite adjustments are examples of the latter. These adjustments can be relatively intuitive and convenient for a user.

When the cover 110 is manipulated to change the subconfiguration of the support structure 134, the first and fourth hinges 112, 132 can bend as needed. In this way, the first and fourth hinges 112, 132 can allow a portion of the backing 108 between the first coupling component 124 and the first hinge 112 to act as another articulated panel within the closed loop. The respective placements of the first and second coupling components 124, 126 and the respective widths of the individual panels 116 perpendicular to the long axis of the first hinge 112 can be selected to control the angles at which the device 102 is self-supporting when the cover 110 is in the open configuration and the first and second coupling components 124, 126 are attached to one another. For example, the intermediate panel 116b can be more narrow than the distal panel 116c and the proximal panel 116a can be more narrow than the intermediate panel 116b and more narrow than the distal panel 116c. In at least some embodiments, the combined width of the proximal and intermediate panels 116a, 116b is from 95% to 120% of the width of the distal panel 116c. The respective stiffness of the first, second, third, and fourth hinges 112, 118, 120, 132 can be selected to facilitate transitioning between the subconfigurations shown in FIGS. 10-13. For example, one or more of the first, second, third, and fourth hinges 112, 118, 120, 132 can scored, thinned, or otherwise configured to have a preferential bending axis. As with the first hinge, 112, the second, third, and fourth hinges 118, 120, 132 individually can be configured to bend at one axis or at more than one axis.

Figure 13:
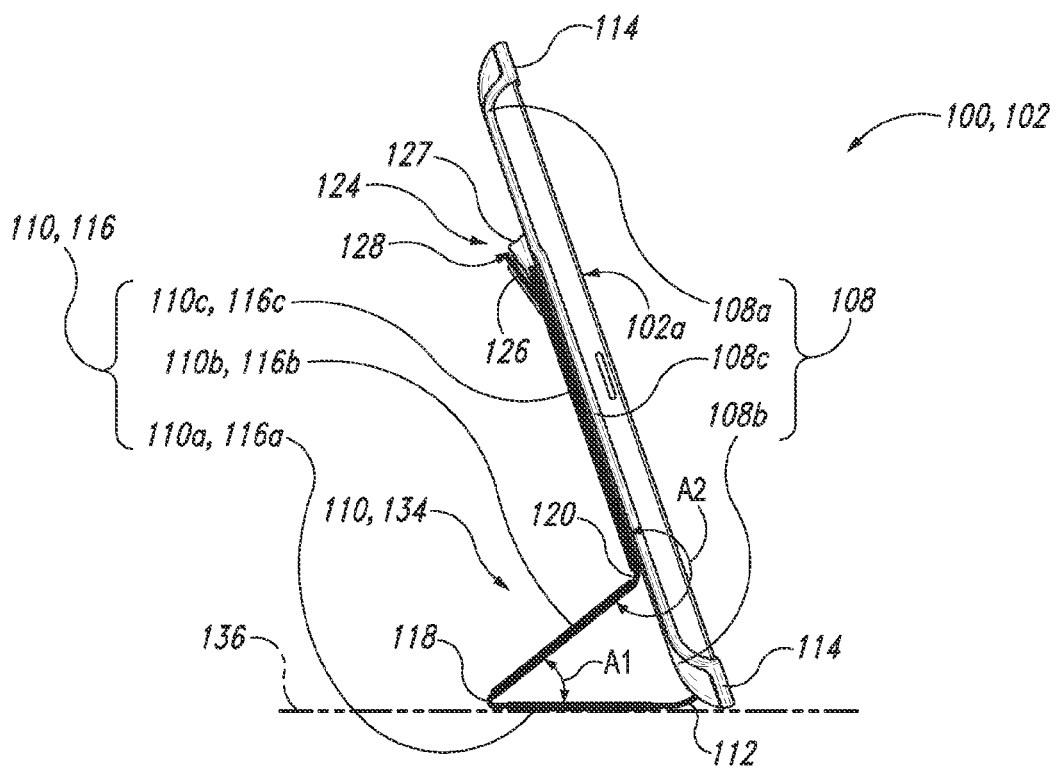
Figure 14:
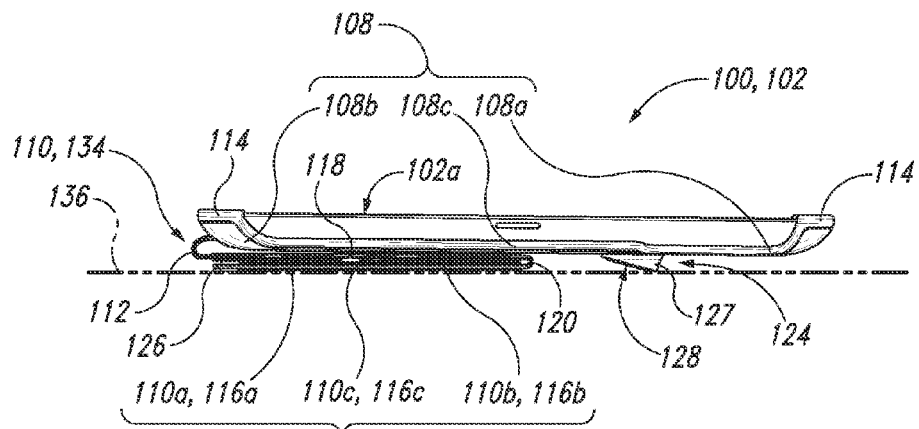
FIGS. 14-19 are side profile views of the case and the device shown in FIGS. 1 and 2 with the cover in the open configuration and the first and second coupling components detached from one another. The support structure is shown in FIGS. 14-19 in six different respective subconfigurations to support the device at six different respective angles relative to the support surface.
Figure 15:
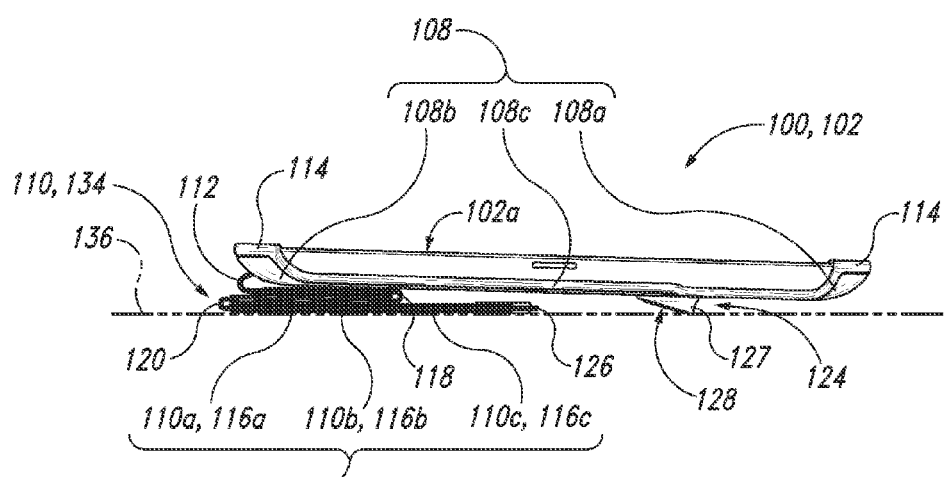
Figure 16:
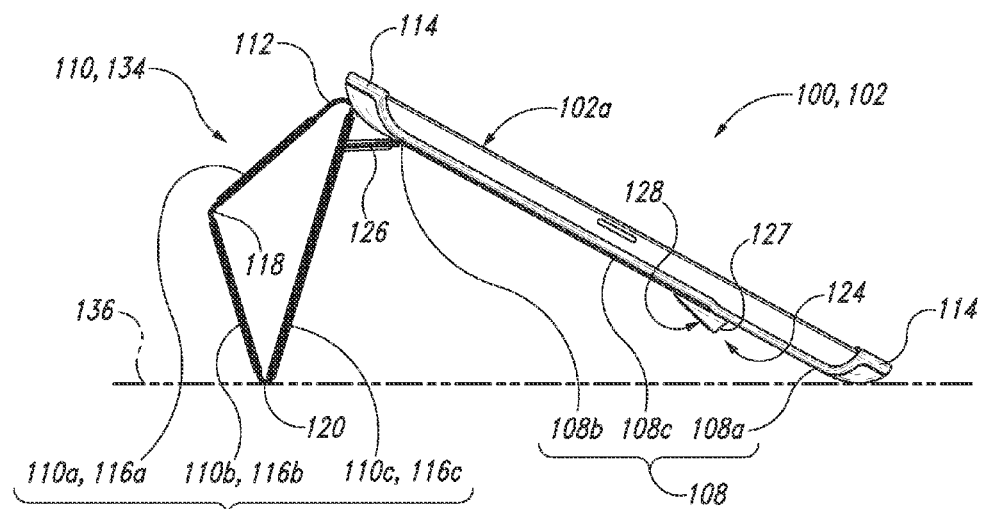

As shown in FIGS. 10 and 11 relative to FIGS. 12 and 13, the angles at which the device 102 is self-supporting can be different depending on the orientation of the device 102. The device 102 can include a sensor (not shown) that automatically reorients the screen 104 depending on the orientation of the device 102. Thus, adjustment of the support structure 134 and reorientation of the device 102 can be used together to cause the device 102 to be self-supporting at four different angles. Although the cover 110 in the illustrated embodiment includes three panels 116, in other embodiments, the cover 110 can include a greater number of panels 116, which may allow the device 102 to be self-supporting at an even greater number of angles. Furthermore, when the cover 110 is in the open configuration, the first and second coupling components 124, 126 can be detached from one another to allow for adjustment of the angle at which the device 102 is self-supporting. FIGS. 14-19 are side profile views of the case 100 and the device 102 with the cover 110 in the open configuration and the first and second coupling components 124, 126 detached from one another. The support structure 134 is shown in FIGS. 14-19 in six different respective subconfigurations to support the device 102 at six different respective angles relative to the support surface 136. In the subconfigurations shown in FIGS. 14 and 17, the first coupling component 124 can be magnetically coupled to the distal panel 116c. In the subconfiguration shown in FIG. 18, the position at which the distal edge of the distal panel 116c contacts the central portion 108c of the backing 108 can be varied to change the angle of the device 102. Similarly, in the subconfiguration shown in FIG. 19, the position at which the third hinge 120 contacts the central portion 108c of the backing 108 can be varied to change the angle of the device 102.

Figure 17:
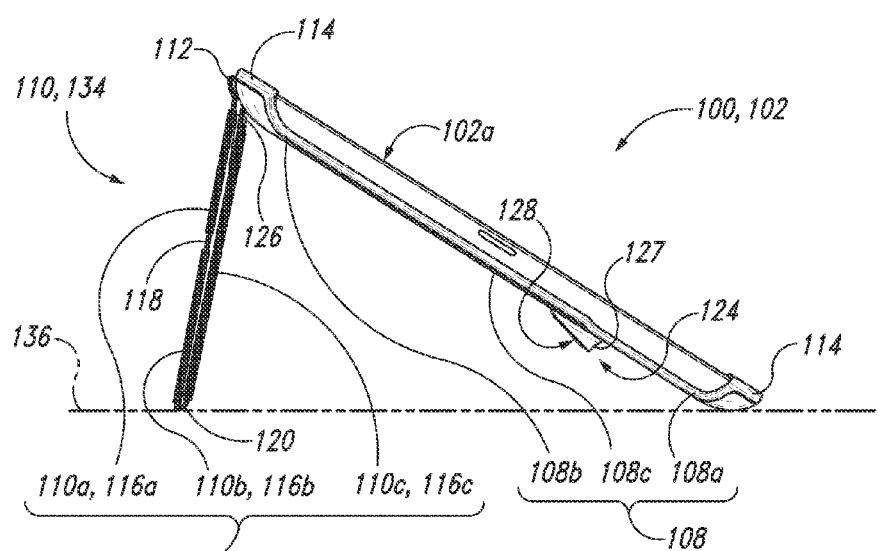
Figure 18:
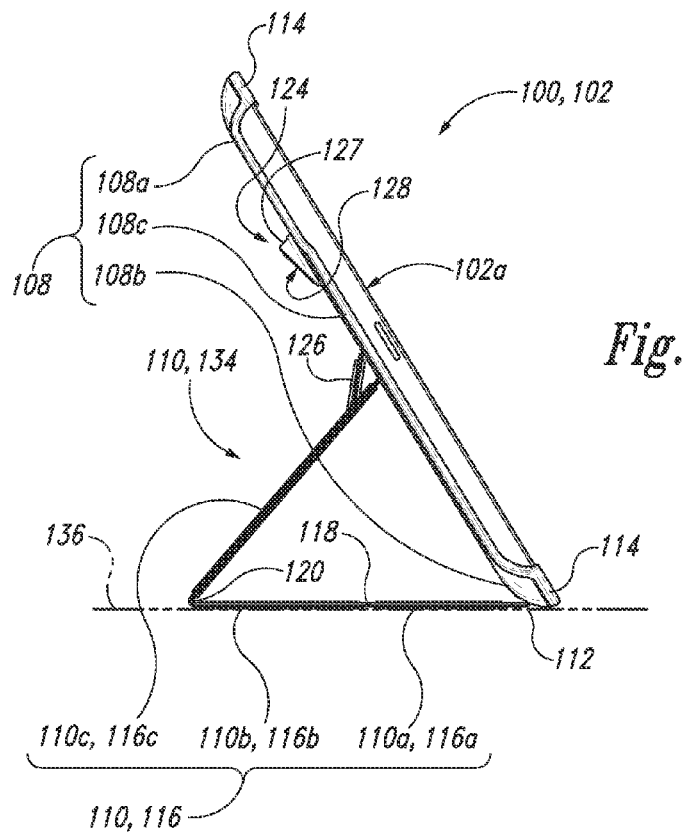
Figure 19:
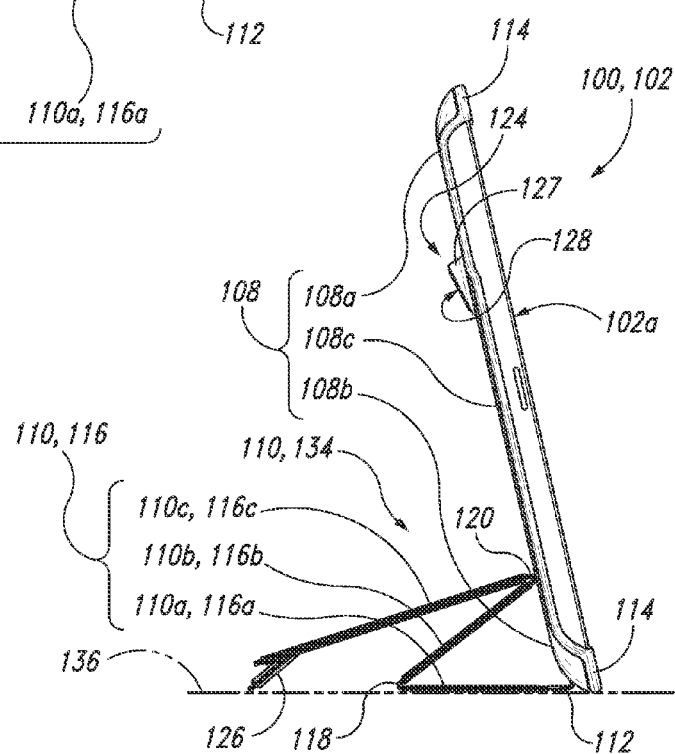

FIG. 20 is a side profile view of a portion of the case 100 with the cover 110 in the open configuration, the first and second coupling components 124, 126 detached from one another, and the support structure 134 in the subconfiguration shown in FIG. 17. In this subconfiguration, a keyboard overlay 138 can be conveniently stowed within the support structure 134. The keyboard overlay 138 can be a suitable keyboard overlay described in U.S. Pat. No. 8,206,047, which is incorporated herein by reference in its entirety. The keyboard overlay 138 can be configured to be magnetically coupled to the front side 102a of the device 102 in an operable position at which the keyboard overlay 138 is usable in conjunction with a virtual keyboard (not shown) displayed on the screen 104. As shown in FIG. 20, when stowed, the keyboard overlay 138 can be interposed between the proximal and distal panels 116a, 116c and flush with the distal panel 116c. The widths of one or more of the individual panels 116 can be selected to facilitate this arrangement. In at least some embodiments, moving the cover 110 from the open configuration to the closed configuration automatically deploys the keyboard overlay 138 into its operable position at the front side 102a of the device 102.

FIG. 21 is an enlarged cross-sectional view taken along the line 21-21 in FIG. 20. As shown in FIG. 21, the keyboard overlay 138 can include a magnetic coupler 140 including a magnetically active portion 142. The magnetically active portion 142 can be positioned to be aligned with a peripheral magnet within the peripheral region 106 at the front side 102a of the device 102 when the keyboard overlay 138 is in its operable position. When the keyboard overlay 138 is stowed, it can be interposed between the proximal and distal panels 116a, 116c such that the magnetically active portion 142 of the magnetic coupler 140 is positioned between a first region 144 of the proximal panel 116a and an opposing second region 146 of the distal panel 116c. The second region 146 of the distal panel 116c can be configured to form a stronger magnetic bond with the magnetically active portion 142 of the magnetic coupler 140 than does the first region 144 of the proximal panel 116a. In the illustrated embodiment, the distal panel 116c includes a distal plate 148 made at least predominantly of ferrous metal that extends through the second region 146. In contrast, the proximal panel 116a can include a proximal plate 150 made at least predominantly of ferrous metal that includes a cut-away 152 at the first region 144. This can cause the keyboard overlay 138 to tend to travel with the distal panel 116c rather than with the proximal panel 116a when the cover 110 is moved from the open configuration to the closed configuration. In another embodiment, the distal plate 148 is made at least predominantly of ferrous metal and the proximal plate 150 is made at least predominantly of a non-magnetic material, such as fiberglass. In yet another embodiment, the distal and proximal plates 148, 150 are made at least predominantly of a non-magnetic material and the distal plate 148 includes a magnet (not shown) positioned to form a magnetic bond with the magnetically active portion 142 of the magnetic coupler 140 when the keyboard overlay 138 is stowed.

FIGS. 22-24 illustrate use of the case 100 in conjunction with the keyboard overlay 138 when cover 110 is in the closed configuration. FIG. 22 is a profile view of the case 100 and the device 102 with the cover 110 in the closed configuration. The keyboard overlay 138 (not shown in FIG. 22) can be positioned between the distal panel 116c and the front side 102a of the device 102. FIGS. 23 and 24 are, respectively, different perspective views of the case 100 and the device 102 with the cover 110 in the process of being opened so that the keyboard overlay 138 either remains on the front side 102a of the device 102 (FIG. 23) or is withdrawn from the front side 102a of the device 102 (FIG. 24). With reference to FIGS. 22-24 together, the cover 110 can include a pair of first gripping elements 154 at its distal portion 110c. The keyboard overlay 138 can include a second gripping element 156 positioned such that the first and second gripping elements 154, 156 are non-overlapping when the keyboard overlay 138 is in its operable position at the front side 102a of the device 102 and the cover 110 is in the closed configuration. In the illustrated embodiment, the first gripping elements 154 are rounded flaps extending distally from a distal edge of the first coupling component 124 and the second gripping element 156 is positioned between the first gripping elements 154 when the keyboard overlay 138 is in its operable position at the front side 102a of the device 102 and the cover 110 is in the closed configuration. In other embodiments, the first and second gripping elements 154, 156 can have other suitable forms. As shown in FIG. 23, the first gripping elements 154 can be configured to facilitate breaking a magnetic connection between the cover 110 and the keyboard overlay 138 when the keyboard overlay 138 is in its operable position and the cover 110 is being moved out of the closed configuration. As shown FIG. 24, the second gripping element 156 can be configured to facilitate breaking a magnetic connection between the keyboard overlay 138 and an embedded magnet (not shown) within the peripheral region 106 of the device 102 when the keyboard overlay 138 is in its operable position the cover 110 is being moved out of the closed configuration.

Figure 25:
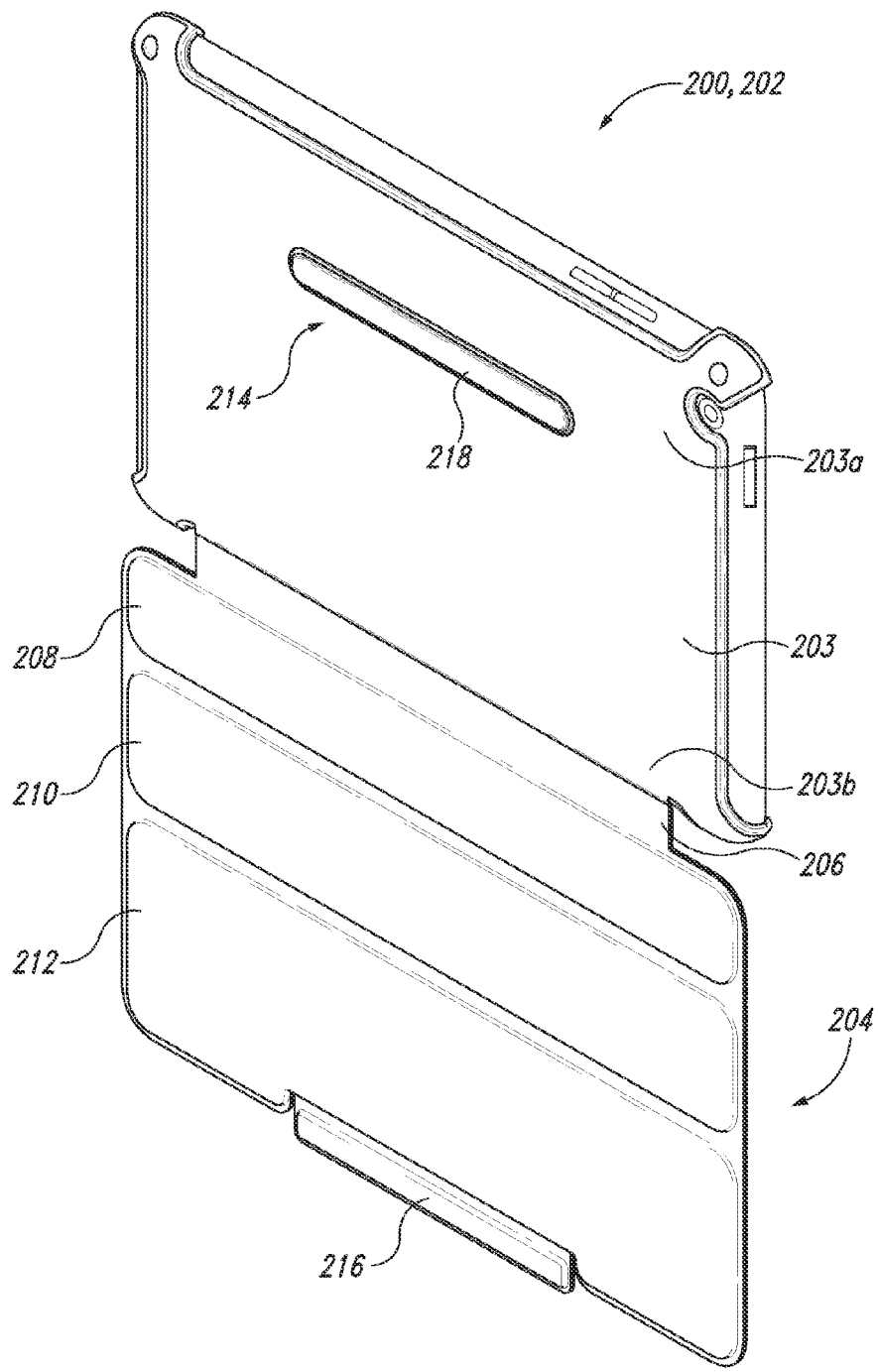
FIGS. 25 and 26 are, respectively, different perspective views of a protective case configured in accordance with another embodiment of the present technology and an associated electronic device.
Figure 26:
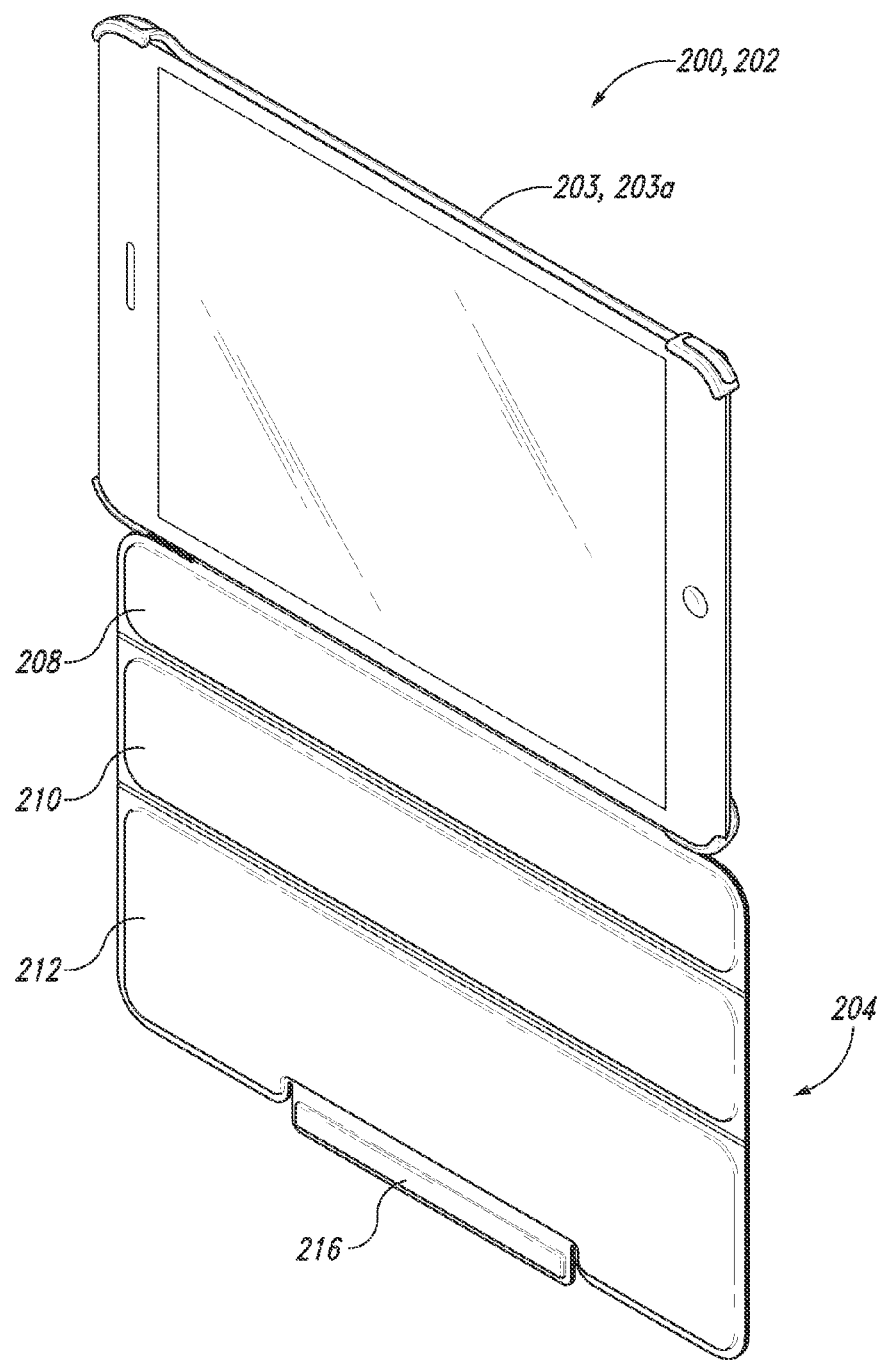
Figure 27:
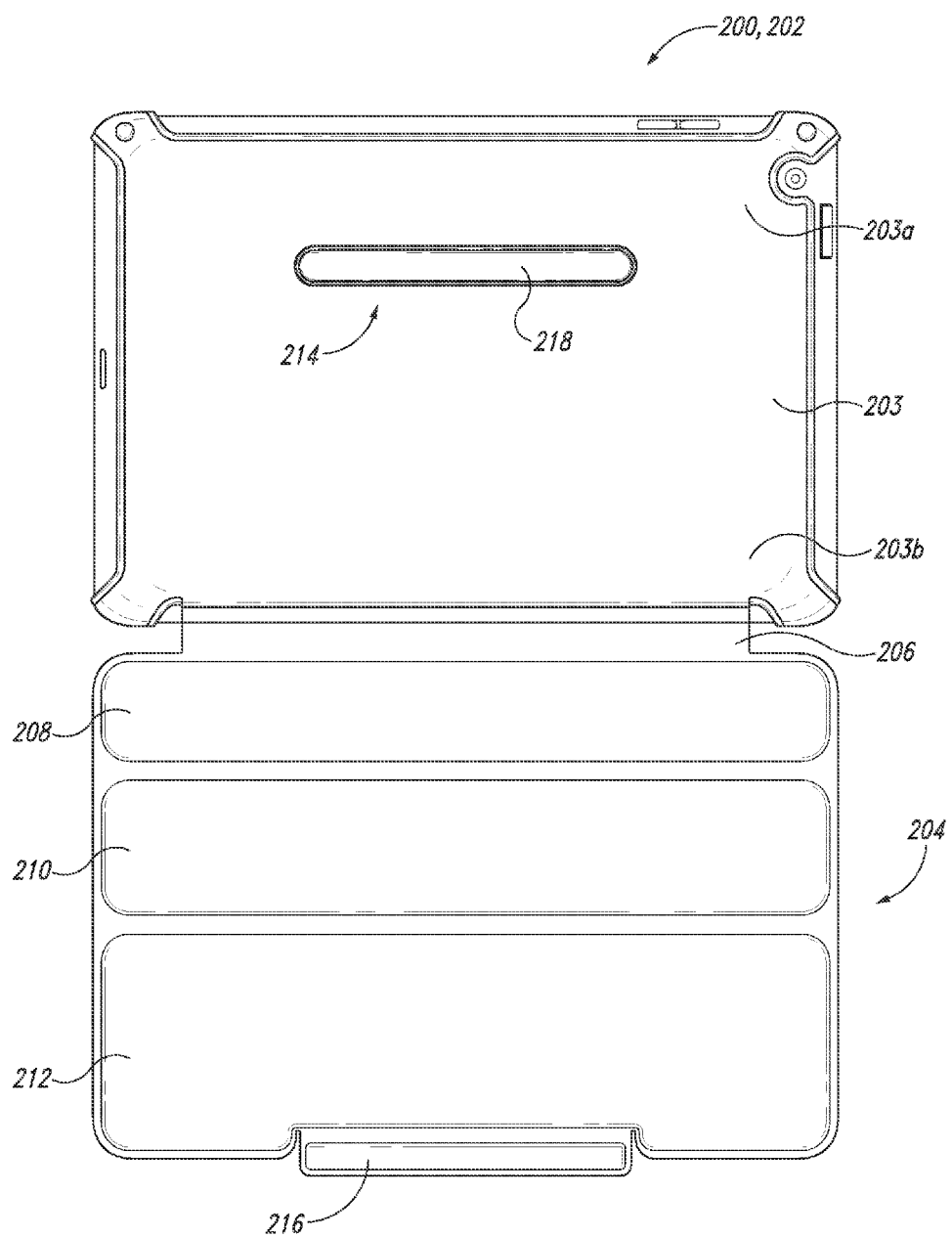
FIGS. 27, 28, 29, 30, 31 and 32 are, respectively, an inverse plan view, a plan view, a first side profile view, a second side profile view, a first end profile view, and a second end profile view of the case and the device shown in FIGS. 25 and 26.
Figure 28:
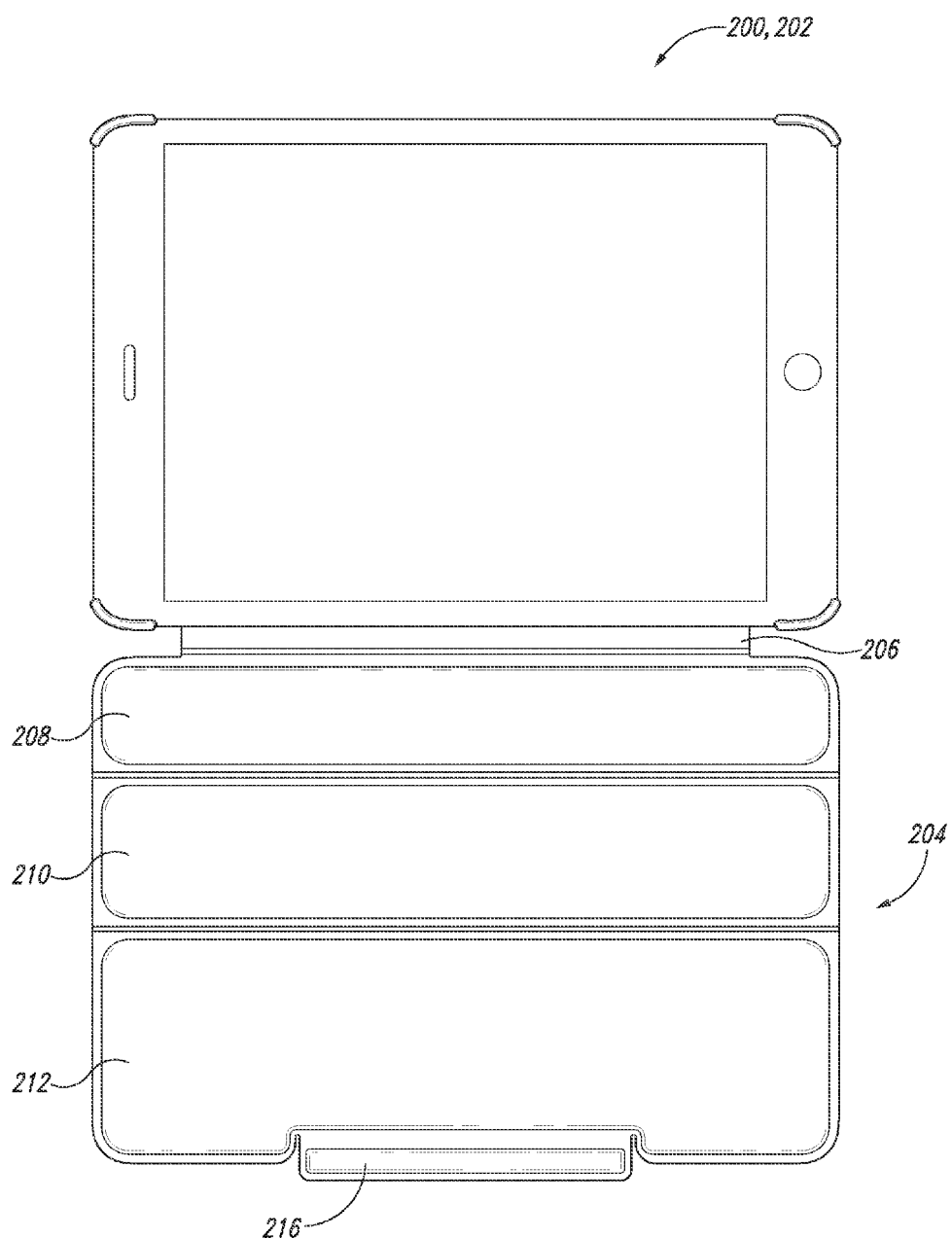
Figures 29, 30:
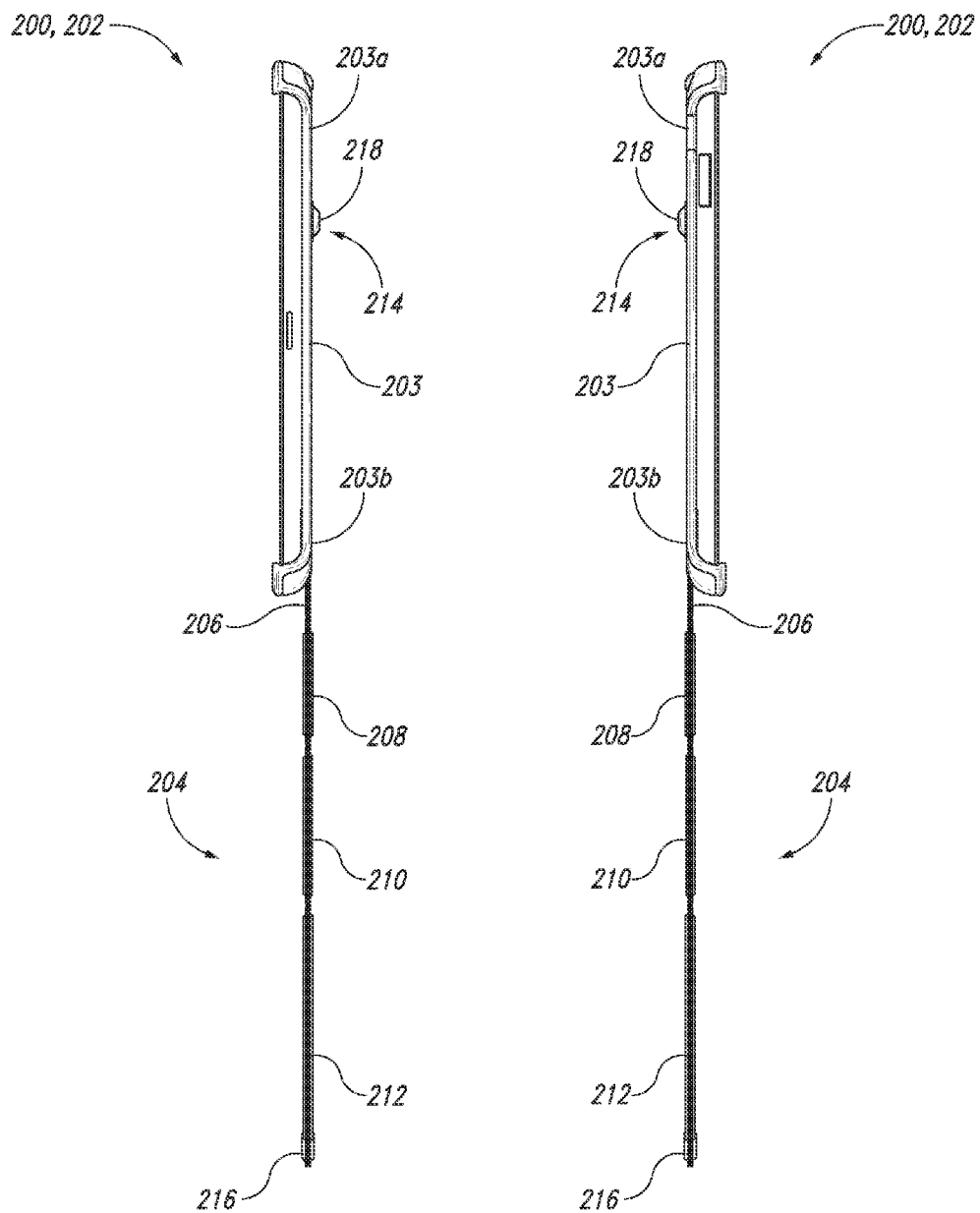
Figure 31:
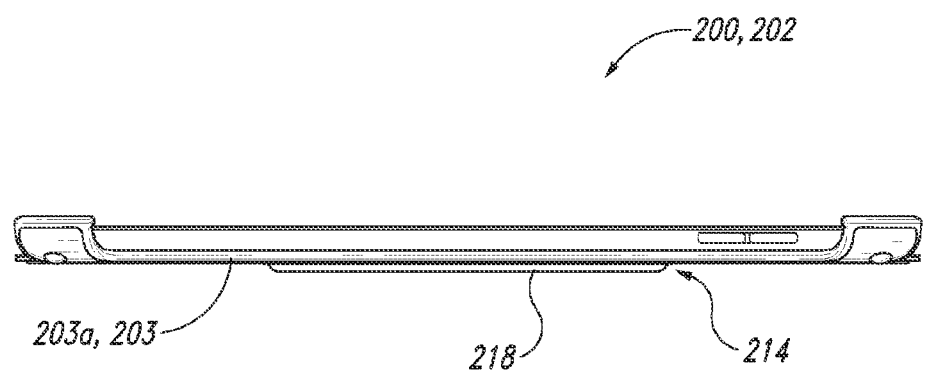
Figure 32:
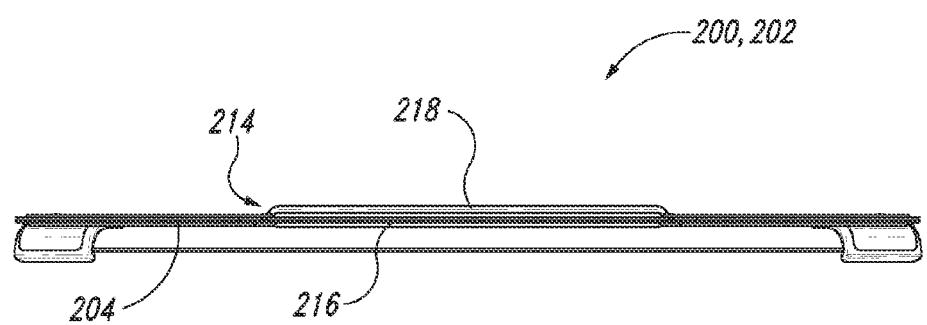

FIGS. 25 and 26 are, respectively, different perspective views of a protective case 200 configured in accordance with another embodiment of the present technology and an associated electronic device 202. FIGS. 27, 28, 29, 30, 31 and 32 are, respectively, an inverse plan view, a plan view, a first side profile view, a second side profile view, a first end profile view, and a second end profile view of the case 200 and the device 202. With reference to FIGS. 25-32 together, the case 200 can be generally similar to the case 100 discussed above with reference to FIG. 1-24. For example, the case 200 can include a backing 203 having a first end portion 203a and an opposite second end portion 203b. The case 200 can further include cover 204 and a hinge 206 extending between the backing 203 and the cover 204. The cover 204 can include a proximal panel 208, an intermediate panel 210, and a distal panel 212 increasingly distant from the hinge 206. Spaced apart from its first and second end portions 203a, 203b, the backing 203 can include a first coupling component 214. Extending distally from the distal panel 212, the cover 204 can include a second coupling component 216.

With reference to FIGS. 1-32 together, the cases 100, 200 can be configured for use with different types of devices. For example, the device 202 can be smaller and/or lighter than the device 102. In the context of use with relatively small and light devices, it may be useful to modify the first and second coupling components 124, 126. For example, instead of including the bearing 127, the first coupling component 214 can include a flat bearing 218. The downward forces associated with use of a smaller and lighter device may tend to be less than the downward forces associated with use of a larger and heavier device. Accordingly, in some embodiments, the structural advantage of the bearing 127 may be unnecessary and a lower profile of the bearing 218 may be desirable. Other factors can also influence selection of the bearing 218 over the bearing 127 or selection of other suitable configurations of the first coupling component 214.

Although the bearings 127, 218 in the embodiments illustrated in FIGS. 1-32 project outwardly from the respective backings 108, 203, in other embodiments the bearings 127, 218 can be flush with or inset into the respective backings 108, 203. For example, the second coupling components 126, 216 can be embedded within the respective backings 108, 203. Furthermore, the second coupling components 126, 216 can be covered with a cloth or another flexible material that extends over the respective backings 108, 203. Still further, the second coupling components 126, 216 and the respective backings 108, 203 can be compositionally the same or similar. For example, the second coupling components 126, 216 can be co-molded with the respective backings 108, 203 from the same material. Other configurations for the second coupling components 126, 216 and the backings 108, 203 are also possible. As one such configuration, the This disclosure is not intended to be exhaustive or to limit the present technology to the precise forms disclosed herein. Although specific embodiments are disclosed herein for illustrative purposes, various equivalent modifications are possible without deviating from the present technology, as those of ordinary skill in the relevant art will recognize. In some cases, well-known structures and functions have not been shown and/or described in detail to avoid unnecessarily obscuring the description of the embodiments of the present technology. Although steps of methods may be presented herein in a particular order, in alternative embodiments the steps may have another suitable order. Similarly, certain aspects of the present technology disclosed in the context of particular embodiments can be combined or eliminated in other embodiments. Furthermore, while advantages associated with certain embodiments may have been disclosed in the context of those embodiments, other embodiments may also exhibit such advantages, and not all embodiments need necessarily exhibit such advantages or other advantages disclosed herein to fall within the scope of the present technology.

Throughout this disclosure, the singular terms "a," "an," and "the" include plural referents unless the context clearly indicates otherwise. Similarly, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. Additionally, the terms "comprising" and the like are used throughout this disclosure to mean including at least the recited feature(s) such that any greater number of the same feature(s) and/or one or more additional types of features are not precluded. Directional terms, such as "upper," "lower," "front," "back," "vertical," and "horizontal," may be used herein to express and clarify the relationship between various elements. It should be understood that such terms do not denote absolute orientation. Reference herein to "one embodiment," "an embodiment," or similar formulations means that a particular feature, structure, operation, or characteristic described in connection with the embodiment can be included in at least one embodiment of the present technology. Thus, the appearances of such phrases or formulations herein are not necessarily all referring to the same embodiment. Furthermore, various particular features, structures, operations, or characteristics may be combined in any suitable manner in one or more embodiments of the present technology.

We claim:

1. A protective case for use with a slab-shaped electronic device having a front side, a screen at the front side, and a back side opposite to the front side, the case comprising:
    a backing shaped to securely attach to the back side of the electronic device, the backing including—
        a first end portion configured to secure at least a portion of a first edge of the electronic device,
        a second end portion configured to secure at least a portion of an opposite second edge of the electronic device, and
        a coupling component spaced apart from the first and second end portions of the backing;
    an articulated cover including—
        a plurality of panels including—
            a proximal panel, and
            a distal panel, wherein the distal panel includes a distally oriented inset, and
        a tab hingedly connected to and extending distally from the distal panel, wherein the tab is releasably securable to the coupling component, and wherein the tab is positioned at least partially within the inset; and
    a hinge operably positioned between the cover and the second end portion of the backing, wherein the proximal panel is closer to the hinge than is the distal panel,
    wherein the cover is movable between—
        a closed configuration in which the coupling component and the tab are detached from one another and the plurality of panels is disposed in a coplanar arrangement along the front side of the electronic device, and
        an open configuration in which the coupling component and the tab are attached to one another and the plurality of panels form a support structure that supports the electronic device at an angle relative to a horizontal support surface, the support structure being adjustable to change the angle without detaching the coupling component and the tab from one another.

2. A system for use with a slab-shaped electronic device having a front side, a screen at the front side, and a back side opposite to the front side, the system comprising:
    a protective case including—
        a backing shaped to securely attach to the back side of the electronic device;
        an articulated cover, and
        a hinge operably positioned between the cover and the backing, and
    a keyboard overlay including a magnetic coupler,
    wherein—
        the cover includes—
            a proximal panel closest to the hinge, and
            a distal panel furthest from the hinge,
        the cover is movable between—
            a closed configuration in which the proximal and distal panels are disposed in a coplanar arrangement along the front side of the electronic device, and
            an open configuration in which the proximal and distal panels form a support structure that supports the electronic device at an angle relative to a horizontal support surface,
        the keyboard overlay, when not in use and when the cover is in the open configuration, can be stowed flush with the distal panel such that moving the cover from the open configuration to the closed configuration automatically deploys the keyboard overlay into an operable position at the front side of the electronic device,
        the keyboard overlay, when stowed, is interposed between the proximal and distal panels such that a magnetically active portion of the magnetic coupler is disposed between a first region of the proximal panel and an opposing second region of the distal panel, and
        the second region is configured to form a stronger magnetic bond with the magnetically active portion of the magnetic coupler than is the first region.

3. The system of claim 2 wherein:
    the proximal and distal panels respectively include plates made at least predominantly of ferrous metal; and
    the plate of the proximal panel includes a cut-away at the first region.

4. A system, including:
    a slab-shaped electronic device including—
        a front side,
        a back side opposite to the front side,
        a screen at the front side,
        a peripheral region around the screen, and
        an embedded magnet at the peripheral region;
    a protective case including—
        a backing shaped to securely attach to the back side of the electronic device,
        a cover configured to be moved into and out of a closed configuration in which the cover is flush with the front side of the electronic device, and
        a hinge operably positioned between the cover and the backing, wherein the cover includes—
a proximal portion closest to the hinge,
a distal portion furthest from the hinge, and
a first gripping element at the distal portion; and
a keyboard overlay including—
a magnetic coupler having a magnetically active region positioned to be aligned with the embedded magnet when the keyboard overlay is in an operable position at the front side of the electronic device, and
a second gripping element,
wherein—
the first gripping element is configured to facilitate breaking a magnetic connection between the cover and the keyboard overlay when the keyboard overlay is in the operable position and the cover is moved out of the closed configuration, and
the second gripping element is configured to facilitate breaking a magnetic connection between the keyboard overlay and the embedded magnet when the cover is moved out of the closed configuration.

5. The system of claim 4 wherein the first and second gripping elements are non-overlapping when the keyboard overlay is in the operable position and the cover is in the closed configuration.

6. The protective case of claim 1 wherein the coupling component is hingedly connected to the backing.

7. The protective case of claim 1 wherein the coupling component includes a wedge-shaped bearing.

8. The protective case of claim 1 wherein the coupling component and the tab are configured to be magnetically attached to one another.

9. The protective case of claim 1 wherein the coupling component is positioned closer to the first end portion of the backing than to the second end portion of the backing.

10. The protective case of claim 9 wherein:
the backing includes a planar central portion extending between the first and second end portions of the backing;
the first and second end portions of the backing and the coupling component are elongate and parallel; and
the coupling component is centrally positioned between the first end portion of the backing and an axis parallel to the first and second end portions of the backing that bisects the central portion of the backing.

11. The protective case of claim 1 wherein the hinge bends at two or more axes.

12. The protective case of claim 11 wherein the hinge is a flexure bearing.

13. The protective case of claim 1 wherein:
the hinge is a first hinge;
the plurality of panels includes an intermediate panel between the proximal and distal panels; and
the cover includes—
a second hinge operably positioned between the proximal and intermediate panels,
a third hinge operably positioned between the intermediate and distal panels, and
a fourth hinge operably positioned between the distal panel and the tab.

14. The protective case of claim 13 wherein:
the proximal, distal, and intermediate panels are elongate and parallel;
the proximal panel is more narrow than the intermediate panel; and
the intermediate panel is more narrow than the distal panel.

15. The protective case of claim 13 wherein:
the proximal, distal, and intermediate panels and the backing collectively form at least a portion of a perimeter of closed loop when the cover is in the open configuration;
the closed loop includes—
a first interior angle between the proximal and intermediate panels, and
a second interior angle between the intermediate and distal panels; and
the support structure is adjustable to change the angle by either—
adjusting the second hinge to increase the first interior angle and adjusting the third hinge to decrease the second interior angle, or
adjusting the second hinge to decrease the first interior angle and adjusting the third hinge to increase the second interior angle.

16. The protective case of claim 1 wherein:
the proximal and distal panels are elongate and parallel; and
the proximal panel is more narrow than the distal panel.

17. The protective case of claim 1 wherein:
the backing includes a planar central portion extending between the first and second end portions of the backing, the central portion having a planar major surface;
the coupling component includes a bearing surface that angles away from the planar major surface of the central portion of the backing such that a proximal end of the bearing surface is closer to the planar major surface than is a distal end of the bearing surface; and
the tab is in face-to-face contact with the bearing surface when the cover is in the open configuration.

18. The system of claim 2 wherein the hinge bends at two or more axes.

19. The system of claim 18 wherein the hinge is a flexure bearing.

20. The system of claim 4 wherein the cover is movable between:
the closed configuration, and
an open configuration in which the cover forms a support structure that supports the electronic device at an angle relative to a horizontal support surface.

21. The system of claim 20 wherein the support structure is adjustable to change the angle.

* * * * *